US008615669B1

(12) United States Patent
Hasko et al.

(10) Patent No.: US 8,615,669 B1
(45) Date of Patent: *Dec. 24, 2013

(54) AVS—ADAPTIVE VOLTAGE SCALING

(75) Inventors: Meir Hasko, Misgav (IL); Erez Reches, Misgav (IL); Reuven Ecker, Haifa (IL); Ido Bourstein, Pardes Hana (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,187

(22) Filed: Sep. 13, 2012

Related U.S. Application Data

(63) Continuation of application No. 12/730,829, filed on Mar. 24, 2010, now Pat. No. 8,370,654.

(60) Provisional application No. 61/163,606, filed on Mar. 26, 2009, provisional application No. 61/181,215, filed on May 26, 2009, provisional application No. 61/289,267, filed on Dec. 22, 2009, provisional application No. 61/308,749, filed on Feb. 26, 2010.

(51) Int. Cl.
*G06F 1/26* (2006.01)
*G05F 3/26* (2006.01)
*G05F 1/10* (2006.01)

(52) U.S. Cl.
USPC ........... 713/300; 713/320; 323/224; 323/234; 323/241; 323/313

(58) Field of Classification Search
USPC ........... 713/300, 320; 323/224, 234, 241, 313
See application file for complete search history.

(56) References Cited

U.S. PATENT DOCUMENTS

| | | | |
|---|---|---|---|
| 6,211,727 B1 | 4/2001 | Carobolante | |
| 6,504,187 B1 * | 1/2003 | Furuichi | 257/207 |
| 6,868,503 B1 * | 3/2005 | Maksimovic et al. | 713/401 |
| 6,933,739 B1 | 8/2005 | Rosen | |
| 7,075,276 B2 * | 7/2006 | Morales | 323/246 |
| 7,276,925 B2 * | 10/2007 | Dobberpuhl et al. | 324/750.3 |
| 7,295,949 B2 * | 11/2007 | Vorenkamp et al. | 702/182 |
| 7,348,857 B1 | 3/2008 | Ecker et al. | |
| 7,417,482 B2 | 8/2008 | Elgebaly et al. | |
| 7,479,768 B1 | 1/2009 | Salmi | |
| 7,639,033 B2 | 12/2009 | Rahim et al. | |
| 7,793,119 B2 | 9/2010 | Gammie et al. | |
| 7,797,083 B1 * | 9/2010 | Brumett et al. | 700/292 |
| 8,010,317 B1 | 8/2011 | Pennanen et al. | |
| 8,022,684 B2 | 9/2011 | Bitting | |
| 8,046,601 B1 | 10/2011 | Paz et al. | |
| 2003/0209803 A1 * | 11/2003 | Suzuki et al. | 257/723 |
| 2005/0218871 A1 * | 10/2005 | Kang et al. | 323/265 |
| 2007/0096775 A1 | 5/2007 | Elgebaly et al. | |
| 2007/0139097 A1 | 6/2007 | Yang | |

(Continued)

*Primary Examiner* — Vincent Tran

(57) ABSTRACT

An integrated circuit includes an operational circuit module receiving a supply voltage from a voltage regulator external to the integrated circuit, and an adaptive voltage scaling module to adjust the supply voltage based on performance characteristics of the operational circuit module. The adaptive voltage scaling module can include a performance monitoring module disposed on the integrated circuit and configured to generate at least an indicator corresponding to at least one performance characteristic of the operational circuit module. The adaptive scaling module can include a voltage requirement determination and voltage feedback generator module disposed on the integrated circuit and coupled to the performance monitoring module. The voltage requirement determination and voltage feedback generator module is configured to output a feedback voltage signal having a voltage level as a function of at least the indicator. The voltage regulator can regulate the supply voltage as a function of the feedback voltage signal.

16 Claims, 9 Drawing Sheets

(56) References Cited

U.S. PATENT DOCUMENTS

| | | | |
|---|---|---|---|
| 2007/0296683 A1* | 12/2007 | Orisaka | 345/100 |
| 2008/0186001 A1 | 8/2008 | Singh et al. | |
| 2009/0289615 A1* | 11/2009 | Foley | 323/318 |
| 2010/0115475 A1* | 5/2010 | Buonpane et al. | 716/2 |
| 2010/0329054 A1 | 12/2010 | Azimi et al. | |
| 2011/0089914 A1 | 4/2011 | Hartman | |

* cited by examiner

AVS—ADAPTIVE VOLTAGE SCALING

INCORPORATION BY REFERENCE

This is a continuation of U.S. application Ser. No. 12/730,829, filed on Mar. 24, 2010, which claims the benefit of U.S. Provisional Application No. 61/163,606, "ON CHIP VOLTAGE CONTROL USING VOLTAGE CONTROL SENSE SIGNAL," filed on Mar. 26, 2009, U.S. Provisional Application No. 61/181,215, "AVS-ADAPTIVE VOLTAGE SCALING," filed on May 26, 2009, U.S. Provisional Application No. 61/289,267, "AVS-ADAPTIVE VOLTAGE SCALING," filed on Dec. 22, 2009 and U.S. Provisional Application No. 61/308,749, "AVS-ADAPTIVE VOLTAGE SCALING," filed on Feb. 26, 2010.

BACKGROUND

Various electronic devices receive one or more supply voltages from voltage regulators that are external to the electronic devices. In an example, an electronic device provides to a voltage regulator an analog voltage feedback that is based on a supply voltage input to the electronic device. The voltage regulator regulates a supply voltage to the electronic device based on the analog voltage feedback that is provided over a single connecting pin. In another example, an electronic device provides to a voltage regulator, over two or more connecting pins, digital feedback that is indicative of an IR drop occurring within the electronic device. The voltage regulator processes the digital feedback and provides a regulated supply voltage to the electronic device responsively to the digital feedback.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

Aspects of the disclosure provide an integrated circuit. The integrated circuit includes a first operational circuit module receiving a first supply voltage from a first voltage regulator that is external to the integrated circuit, and a first adaptive voltage scaling module to adjust the first supply voltage based on performance metric of the first operational circuit module. In an embodiment of the disclosure, the first adaptive voltage scaling module includes a first performance monitoring module. The performance monitoring module is disposed on the integrated circuit, and is configured to generate at least a first indicator corresponding to at least one performance characteristic of the first operational circuit module. Further, the first adaptive scaling module includes a first voltage requirement determination and voltage feedback generator module that is disposed on the integrated circuit, and is coupled to the first performance monitoring module. The first voltage requirement determination and voltage feedback generator module is configured to output a first feedback voltage signal having a voltage level that varies as a function of at least the first indicator. The first voltage regulator is configured to regulate the first supply voltage as a function of the first feedback voltage signal.

In an embodiment, the first voltage requirement determination and voltage feedback generator module is configured to output the first feedback voltage signal as a function of both the first indicator and the first supply voltage.

According to an aspect of the disclosure, the first voltage requirement determination and voltage feedback generator module is configured to output the first feedback voltage signal as an analog signal through a single pin.

Further, in an example, the integrated circuit includes a second operational circuit module receiving a second supply voltage from a second voltage regulator that is external to the integrated circuit, and a second adaptive voltage scaling module. The second adaptive voltage scaling module includes a second performance monitoring module, that is disposed on the integrate circuit, and is configured to generate at least a second indicator corresponding to at least one performance characteristic of the second operational circuit module, and a second voltage requirement determination and voltage feedback generator module that is disposed on the integrate circuit, and is coupled to the second performance monitoring module. The second voltage requirement determination and voltage feedback generator module is configured to output a second feedback voltage signal having a second voltage level that varies as a function of at least the second indicator. The second voltage regulator is configured to regulate the second supply voltage based on the second feedback voltage signal.

Further, in an embodiment, the first voltage requirement determination and voltage feedback generator module includes a digital portion configured to generate a digital control signal based on the first indicator, a digital-to-analog converter module configured to convert the digital control signal to a voltage offset corresponding to a performance metric of the integrated circuit, and a combiner configured to combine the voltage offset with the first supply voltage to generate the first feedback voltage signal.

In an example, the integrated circuit includes a power-on reset module configured to disable generation of the first feedback voltage signal when the integrated circuit is in a start-up mode, and an initial feedback voltage generation module configured to supply an initial feedback voltage signal to the first voltage regulator when generation of the first feedback voltage signal is disabled. Further, the power-on reset module is configured to disable generation of the first feedback voltage signal by disabling a combiner that combines the first supply voltage with a voltage offset corresponding to a performance characteristic of the integrated circuit.

In an embodiment, the first performance monitoring module further includes at least one of a digital ring oscillator (DRO) and a high sensitivity ring oscillator (HSRO) to generate the first indicator. In an example, the first indicator is indicative of an oscillating speed of at least one of the DRO and HSRO.

Aspects of the disclosure can also provide a method for controlling a supply voltage. The method includes generating in an integrated circuit at least a first indicator corresponding to at least a performance characteristic of a first operational circuit module operating under a first supply voltage provided by a first voltage regulator that is external to the integrated circuit, and providing to the first voltage regulator a first feedback voltage signal as a function of at least the first indicator. The first voltage regulator regulates the first supply voltage based on the first feedback voltage signal.

To provide to the first voltage regulator the first feedback voltage signal, the method includes providing the first feedback voltage signal as a function of both the first indicator and the first supply voltage. Further, the method includes outputting the first feedback voltage signal as an analog signal through a single pin.

In an embodiment, the method includes generating in the integrated circuit a second indicator corresponding to at least a performance characteristic of a second operational circuit module operating under a second supply voltage provided by a second voltage regulator that is external to the integrated circuit, and providing to the second voltage regulator a second feedback voltage signal as a function of at least the second indicator. The second voltage regulator regulates the second supply voltage based on the second feedback voltage signal.

Further, the method includes generating a digital control signal based on the first indicator, converting the digital control signal to a voltage offset, and combining the voltage offset with the first supply voltage to generate the first feedback voltage signal.

To convert the digital control signal to the voltage offset, the method includes controlling a current source using the digital control signal to generate the voltage offset.

In an embodiment, the method includes disabling generation of the first feedback voltage signal when the integrated circuit is in a start-up mode, generating an initial feedback voltage signal to the first voltage regulator when generation of the first feedback voltage signal is disabled.

To generate in the integrated circuit the first indicator corresponding to the performance characteristic of the first operational circuit module, the method includes generating the first indicator to be indicative of a speed of at least of a digital ring oscillator (DRO) and a high sensitivity ring oscillator (HSRO).

Aspects of the disclosure can also provide an electronic system. The electronic system includes a first voltage regulator and an integrated circuit coupled together. The first voltage regular is configured to regulate a first supply voltage based on a first feedback voltage signal having a voltage level that varies as a function of at least a performance characteristic of an operational circuit module of the integrated circuit. The integrated circuit includes a first operational circuit module receiving the first supply voltage from the first voltage regulator that is external to the integrated circuit, and a first adaptive voltage scaling module. The first adaptive voltage scaling module includes a first performance monitoring module that is disposed on the integrated circuit and is configured to generate at least a first indicator corresponding to at least one performance characteristic of the first operational circuit module. Further, the first adaptive voltage scaling module includes a first voltage requirement determination and voltage feedback generator module that is disposed on the integrated circuit and coupled to the first performance monitoring module. The first voltage requirement determination and voltage feedback generator module is configured to output the first feedback voltage signal having a voltage level that varies as a function of at least the first indicator.

In an embodiment, the electronic system includes a second voltage regulator configured to regulate a second supply voltage based on a second feedback voltage signal having a voltage level that varies as a function of at least a performance characteristic of an operational circuit module of the integrated circuit. The integrated circuit includes a second operational circuit module receiving the second supply voltage from the second voltage regulator that is external to the integrated circuit, and a second adaptive voltage scaling module. The second adaptive voltage scaling module includes a second performance monitoring module that is disposed on the integrated circuit, and is configured to generate at least a second indicator corresponding to at least one performance characteristic of the second operational circuit module. Further, the second adaptive voltage scaling module includes a second voltage requirement determination and voltage feedback generator module that is disposed on the integrated circuit and is coupled to the second performance monitoring module. The second voltage requirement determination and voltage feedback generator module is configured to output the second feedback voltage signal having a second voltage level that varies as a function of at least the second indicator.

BRIEF DESCRIPTION OF THE DRAWINGS

Embodiments of an adaptive voltage scaling module and an adaptive voltage scaling approach that are compatible with voltage regulators controlled by a, typically analog, voltage feedback signal will be described with reference to the following drawings, wherein like numerals designate like elements, and wherein.

DETAILED DESCRIPTION OF EMBODIMENTS

Figure 1A:
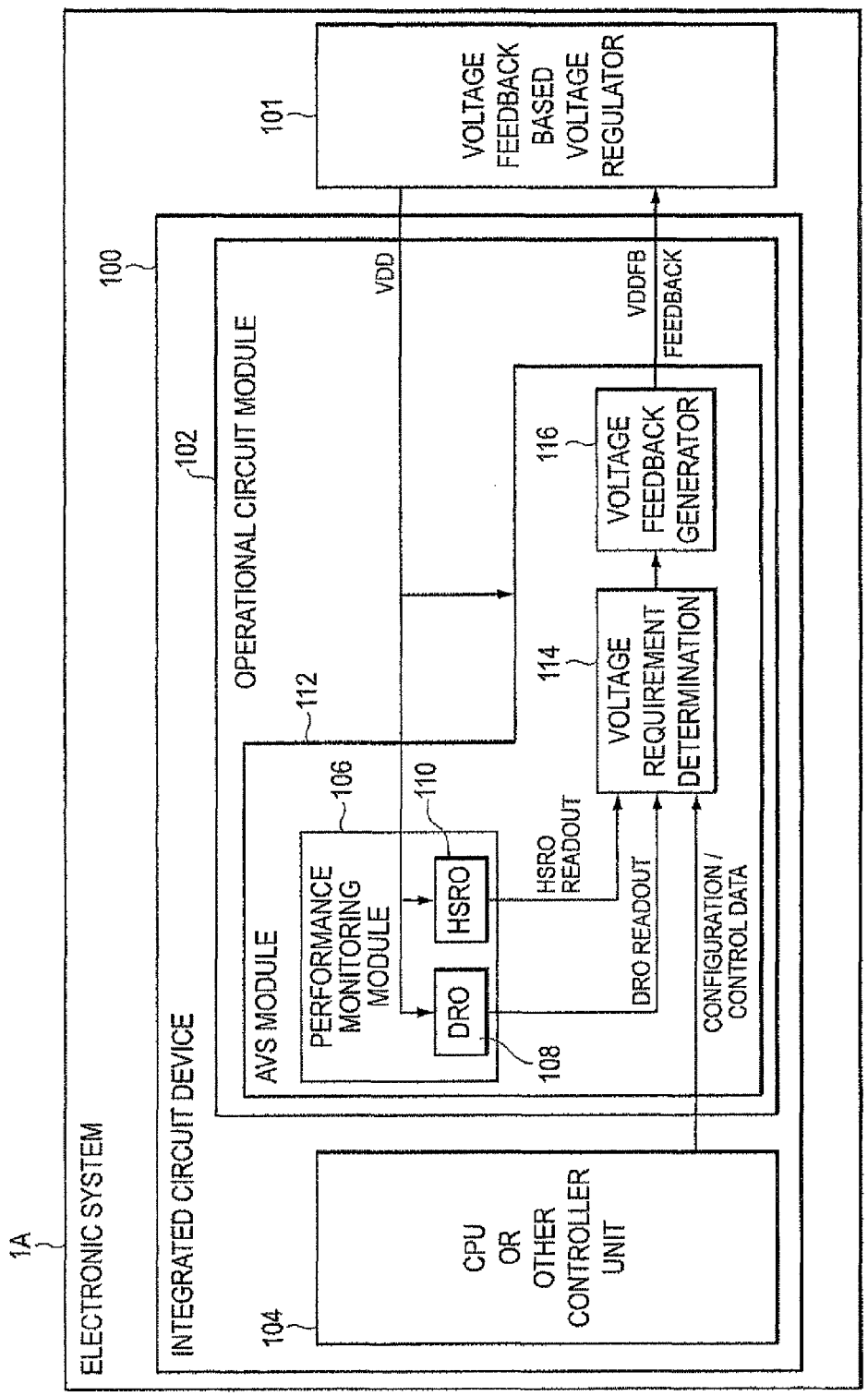
FIG. 1A shows a schematic diagram of an electronic system 1A that includes an adaptive voltage scaling module in accordance with an embodiment of the disclosure.

FIG. 1A shows a schematic diagram of an electronic system 1A that includes an integrated circuit device 100 and a voltage regulator 101 that is responsive to an analog voltage feedback, in accordance with an embodiment of the disclosure. In an embodiment, the electronic system 1A is configured as an electronics device in which the integrate circuit device 100 and voltage regulator 101 are included on a circuit board. As seen in FIG. 1A, operational circuit module 102 is included within the larger integrated circuit device 100, such as a system-on-chip (SOC), that includes other integrated circuit modules, such as a central processing unit (CPU) or other controller unit 104. As further seen in FIG. 1A, the operational circuit module 102 includes an adaptive voltage scaling (AVS) module 112 that has a performance monitoring module 106, a performance based voltage requirement determination module 114, and a voltage feedback generator 116 that generates an adaptive feedback voltage signal VDDFB that has a voltage level which varies as a function of a performance metric of the operational circuit module 102, as determined by the performance monitoring module 106, and as a function of a predetermined target performance value. The adaptive feedback voltage signal VDDFB is provided as feedback to the voltage regulator 101 which, as seen in the example of FIG. 1A, is part of the electronic system 1A but is located externally to the integrated circuit device 100. In an example embodiment, the adaptive feedback voltage signal VDDFB is an analog voltage signal that is supplied over a single pin to the voltage regulator 101. In an embodiment, the performance monitoring module 106, the voltage requirement determination module 114 and the voltage feedback generator 116 are coupled together as seen in FIG. 1A.

In an example embodiment, performance monitoring module 106 includes a digital ring oscillator (DRO) monitoring device 108. In another example embodiment, performance monitoring module 106 includes a high sensitivity ring oscillator (HSRO) monitoring device 110. In still another example embodiment, performance monitoring module 106 includes both DRO 108 and HSRO 110. In still another example embodiment, performance monitoring module 106 includes one or more other suitable performance monitoring modules that are not seen in the figures, such as for example, a temperature measuring circuit and an SRAM speed measuring circuit. Similarly, in an embodiment, voltage requirement determination module 106 makes its determination at least partly based on an actual voltage supplied to operational circuit module 102.

Example embodiments of a digital ring oscillator (DRO) monitoring device, as used in the description below, are described in U.S. Pat. No. 6,933,739, entitled, "RING OSCILLATOR SYSTEM," filed on May 23, 2003, issued on Aug. 23, 2005, and assigned to Marvell Israel (MISL) Ltd. Example embodiments of a high sensitivity ring oscillator (HSRO) monitoring device, as used in the description below, are described in U.S. co-pending Non-Provisional patent application Ser. No. 12/707,142, entitled, "METHOD AND APPARATUS FOR SPEED MONITORING," filed by Eitan Rosen on Feb. 17, 2010, assigned to Marvell Israel (MISL) Ltd. Example embodiments of a suitable temperature measuring circuit are described in co-pending U.S. Non-Provisional patent application Ser. No. 11/874,595, entitled, "METHOD AND APPARATUS OF MEASURING TEMPERATURE," filed by Shimon Avitan on Oct. 18, 2007, assigned to Marvell Israel (MISL) Ltd.

In operation, DRO monitoring device 108 and/or (HSRO) monitoring device 110, monitor performance characteristics at a location within operational circuit module 102, generate one or more indicators, such as DRO readout, HSRO readout, and the like, in accordance with the performance characteristics, and provide the generated indicators to performance based voltage requirement determination module 114. In an embodiment, the indicators are digital signals, however this need not be the case. In an embodiment, AVS module 112 generates the adaptive voltage feedback signal VDDFB based on the indicators and a present supply voltage to the operational circuit module 102. In other words, the adaptive voltage feedback signal VDDFB is at least based in part on a performance metric of the operational circuit module 102, although it could also be based on other metrics such as temperature, SRAM speed or an IR drop. As seen in FIG. 1A, the adaptive voltage feedback signal VDDFB generated by the AVS module 112 is provided as a feedback signal to the voltage regulator 101.

In an embodiment, AVS module 112 includes the performance based voltage requirement determination module 114 and the voltage feedback generator 116. The voltage requirement determination module 114 includes any suitable logic circuit, such as analog logic circuit, digital logic circuit, and the like. In an embodiment, the logic circuit generates a signal that is based on the performance indicators as well as a predetermined performance target value. The signal generated by the voltage requirement determination module 114 is suitable for generating a feedback signal that can be used subsequently to control the voltage supply, for example an analog feedback signal that is indicative of a need to increase or to reduce the voltage supply so as to meet a performance requirement. In an example, the indicators are digital signals, and the voltage requirement determination module 114 includes a digital logic circuit to generate a digital control signal based on the indicators. In another example, the indicators include any other suitable signals, and the logic module 114 includes any suitable logic circuit to generate a control signal based on the indicators. The voltage feedback generator 116 includes any suitable circuit that generates the adaptive voltage feedback signal VDDFB based on the control signal from the voltage requirement determination module 114. In an embodiment, the adaptive voltage feedback signal VDDFB is generated as combinational result of the present supply voltage in combination with a voltage offset that is indicative of a performance metric of the operational circuit module 102 relative to a predetermined performance target value. In an embodiment, as will be discussed in greater detail with respect to FIG. 2A and FIG. 2B, generation of the adaptive voltage feedback signal VDDFB is performed by a current source that generates an offset current based on a control signal and a combiner circuit that combines the offset current (as a voltage) and a supply voltage.

It is noted that in an embodiment AVS module 112 receives signals from other modules, and generates the adaptive voltage feedback signal VDDFB based on the signals. In an example, as seen in FIG. 1A, AVS module 112 receives configuration/control data, such as threshold values, and the like, from CPU or other controller unit 104.

In an example, the configuration/control data includes a target performance value for a timing characteristic monitored by DRO 108 and/or HSRO 110. When the monitored timing characteristic is below the target performance value, for example, AVS module 112 adjusts the voltage feedback signal to the voltage regulator 101, so that the voltage regulator 101 alters the supply voltage to operational circuit module 102 so that the timing characteristic of the DRO 108 and/or HSRO 110 meets the target performance value. It is noted that the DRO 108 and/or HSRO 110 can be configured to monitor or measure performance characteristics of the operation circuit module 102. Thus, when DRO 108 and/or HSRO 110 satisfy a target performance value, the operational circuit module 102 satisfies its corresponding performance characteristics, for example.

Figure 1B:
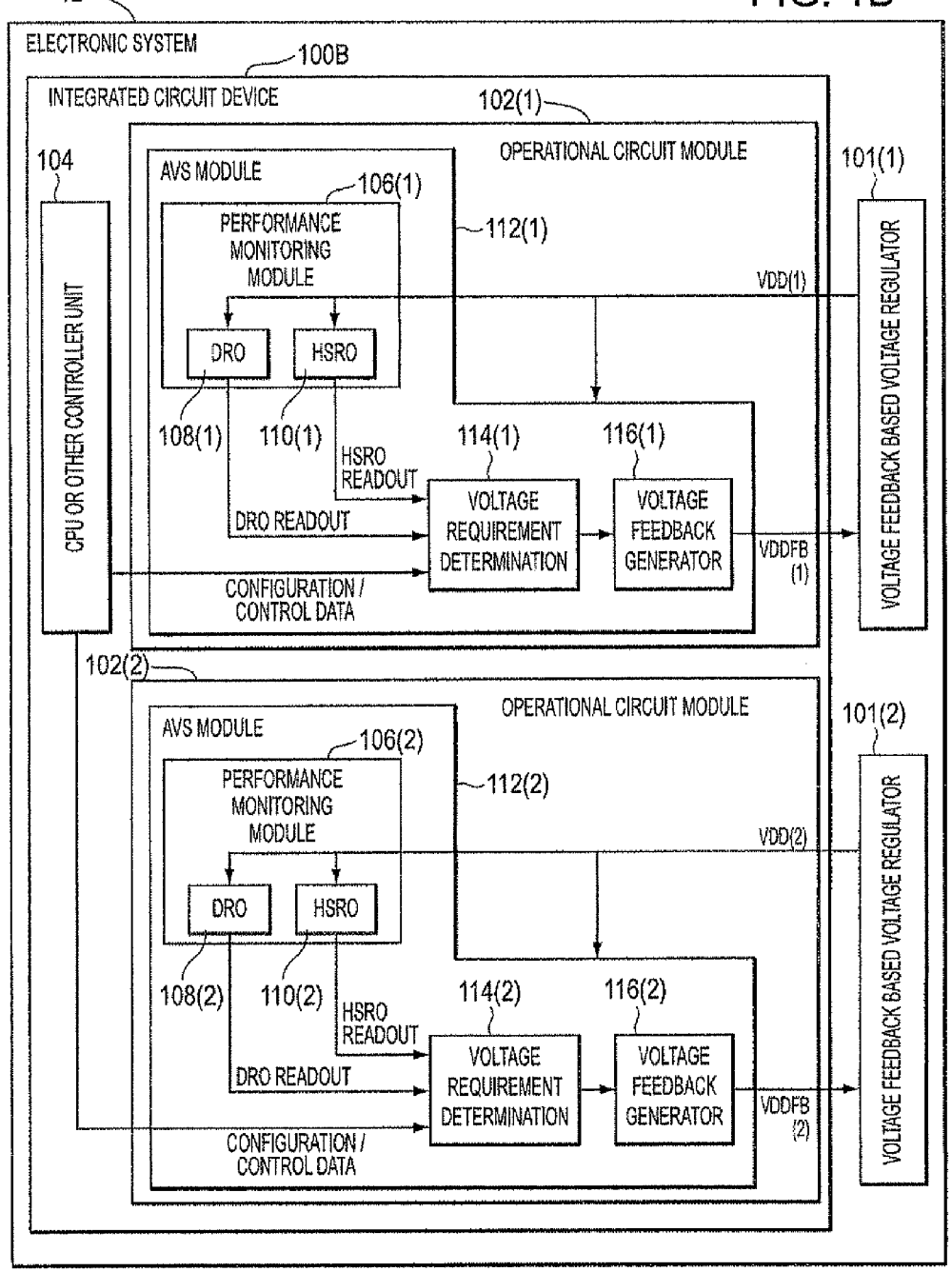
FIG. 1B shows a schematic diagram of an electronic system 1B that includes a plurality of adaptive voltage scaling modules in accordance with another embodiment of the disclosure.

It is noted that an integrated circuit can include multiple AVS modules,

FIG. 1B shows a schematic diagram of an electronic system 1B that includes a plurality of adaptive voltage scaling module 112(1-2) in accordance with an embodiment of the disclosure. Similarly to the electronic system 1A, the electronic system 1B includes an integrated circuit 100B. The integrated circuit 100B includes a first operational circuit module 102(1) and a second operational circuit module 102(2). The first operational circuit module 102(1) includes a first adaptive voltage scaling module 112(1), and the second operational circuit module 102(2) includes a second adaptive voltage scaling module 112(2). Further, the electronic system 1B includes a first voltage regulator 101(1), and a second voltage regulator 101(2) that are external to the integrated circuit 100B.

Similar to the voltage regulator 101 and the operational circuit module 102 in FIG. 1A, the first voltage regulator 101(1) is coupled to the first operational circuit module 102

(1), and the second voltage regulator 101(2) is coupled to the second operational circuit module 102(2). In an example, the first voltage regulator 101(1) and the first operational circuit module 102(1) can be similarly configured as the voltage regulator 101 and the operational circuit module 102, and can operate similarly as the voltage regulator 101 and the operational circuit module 102. Further, the second voltage regulator 101(2) and the second operational circuit module 102(2) can be similarly configured as the voltage regulator 101 and the operational circuit module 102, and can operate similarly as the voltage regulator 101 and the operational circuit module 102. It is noted that the first voltage regulator 101(1) and the first operational circuit module 102(1) can be configured independently of the second voltage regulator 101(2) and the second operational circuit module 102(2), and can operate independently of the operation of the second voltage regulator 101(2) and the second operational circuit module 102(2).

Figure 2A:
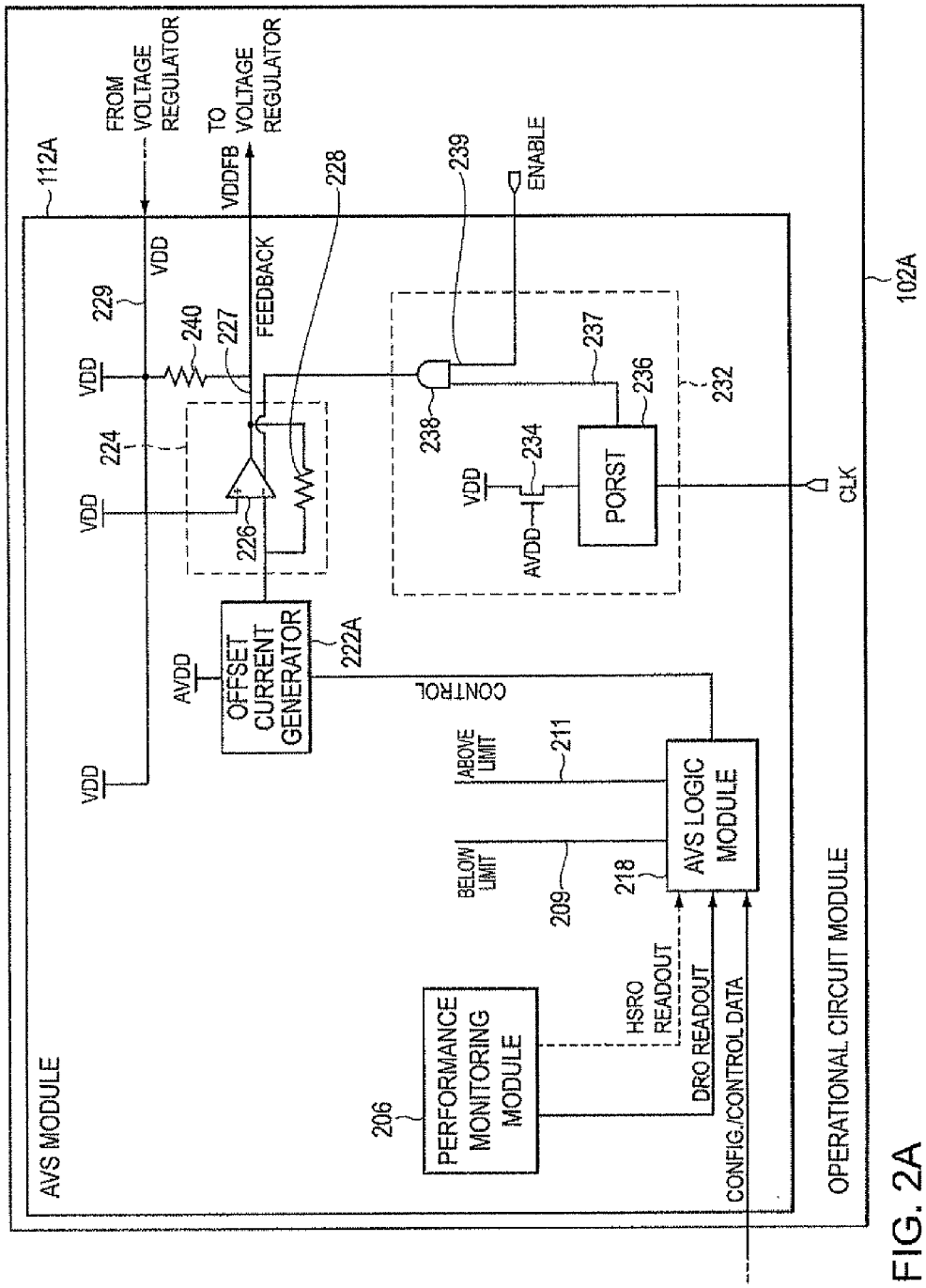
FIG. 2A shows a schematic diagram of an operational circuit module including an adaptive voltage scaling module example in accordance with an embodiment of the disclosure.

FIG. 2A shows a schematic diagram of an operational circuit module 102A that includes an adaptive voltage scaling module 112A in accordance with an embodiment of the disclosure. As seen in FIG. 2A, AVS module 112A includes performance monitoring module 206, AVS logic module 218, offset current generator 222A, a voltage summing circuit 224, a power-on reset module 232 and closed-loop resistor 240. These elements are coupled together as shown in FIG. 2A.

In an embodiment, voltage summing circuit 224 includes an operational amplifier 226, a feedback resistor 228, and a feedback capacitor (not shown). Further, in an embodiment, power-on reset module 232 includes a power control switch 234, a power-on reset controller 236, and an enable logic 238, such as AND gate.

In an embodiment, AVS logic module 218 has the functionality of performance based voltage requirement determination modules 114 seen in FIG. 1A and FIG. 1B. In operation, AVS logic module 218 receives indicators from performance monitoring module 206. In an example, AVS logic module 218 receives a readout value from digital ring oscillator (DRO) monitoring device 108 (not seen in FIG. 2A). Optionally, AVS logic module 218 receives a readout value from high sensitivity ring oscillator (HSRO) monitor device 110 (not seen in FIG. 2A).

AVS logic module 218 generates a control signal based on the indicators, in other words a control signal that is based on, or otherwise related to, a performance metric of the operational circuit module 102A. In an embodiment, AVS logic module 218 additionally receives configuration/control data, such as threshold values for the indicators. AVS logic module 218 compares the received readout value(s) to corresponding threshold values indicative of a performance target to generate difference value(s), for example. The difference value(s) are indicative, for example, of a difference between actual performance and target performance. Next, in an embodiment, AVS logic module 218 determines a control signal based on the generated difference value(s) which is indicative of a supply voltage (or an offset to the existing supply voltage) that is needed in order to meet a performance target, as described below.

It is noted that in an embodiment the AVS logic module 218 generates control signals based on indicators in addition to the indicators from the performance monitoring module 206. In an example, the AVS logic module 218 receives additional indicators based on one or more of temperature, SRAM speed and the present supply voltage VDD, and generates control signals that are based in part on one or more of speed of the operational circuit module 102A relative to a target speed, as well as its temperature, a speed of an SRAM device and an IR drop within the operational circuit module 102A.

In the FIG. 2A example, the AVS logic module 218 receives a below limit indicator from lead 209 and an above limit indicator from lead 211. The below limit indicator indicates whether the present supply voltage VDD is below a predetermined bottom limit. The above limit indicator indicates whether the present supply voltage VDD is above a predetermined upper limit. The AVS logic module 218 employs these limits, for example, to generate a control signal that will result in a voltage feedback signal that causes a voltage regulator 101 to provide a supply voltage that is within operational limits of the operational circuit module 102A.

The AVS logic module 218 generates the control signals, such as for example digital feedback signals, based on the various received indicators. The control signals are passed to offset current generator 222A. In an embodiment, offset current generator 222A includes a controlled current generator that suitably converts the control signals to an analog offset current. Further, voltage summing circuit 224 combines the present supply voltage with the analog offset current (converted to voltage) to generate the feedback signal. In an embodiment, the feedback signal is a feedback voltage signal VDDFB that is supplied to the voltage regulator 101 through a single pin connection. The external voltage regulator 101 will either increase the generated VDD source voltage, decrease the generated VDD source voltage, or allow the generated VDD source voltage to remain the same, based on the magnitude of the received feedback voltage signal VDDFB.

In one embodiment, voltage summing circuit 224 is suitably configured to combine the offset signal, such as the analog offset signal, with the present supply voltage. In an example, the operational amplifier 226 is configured according to a negative feedback configuration. Specifically, the inverting node of the operational amplifier 226 is connected to the output of offset current generator 222A, the non-inverting node of the operational amplifier 226 is connected to source voltage VDD, and with a resistor 228 and a capacitor (not shown) is configured in parallel in the negative feedback path with the result that the output of offset current generator 222A is treated as a voltage. In such a configuration, the output of voltage summing circuit 224 is a substantially linear combination of the output of offset current generator 222A (as a voltage) and the source voltage VDD.

In an embodiment, a power-on reset module 232 enables operation of the voltage summing circuit 224 while the operational circuit module 102A has reached operational stability, and disables the voltage summing circuit during circuit instability, for example a start up mode or when operational circuit module 102A has not yet initially achieved operational stability or when a instability in voltage supply causes an invalid voltage to be supplied to operational circuit module 102A. It is noted that because the output of voltage summing circuit 224 is based in part on a performance metric of operational circuit module 102A, when operational circuit module 102A receives an invalid voltage, during a startup mode for example, the AVS logic module 218 is liable to generate spurious control signals that are not indicative of the real requirements of operational circuit module 102A to achieve a performance target. Because performance based feedback for regulation of the supply voltage is likely to interfere with the power up sequence of the external regulator, or its ability to achieve operational stability, power-on reset module 232 disables the voltage summing circuit 224 whenever the voltage is invalid.

As seen in FIG. 2A, in order to provide a voltage based feedback signal while voltage summing circuit 224 is disabled, AVS module 112A includes closed-loop resistor 240 that forms a closed loop between lead 229 and lead 227. Lead 229 provides the source voltage VDD, from the external voltage regulator to AVS module 112A. Lead 227 provides feedback signal to the external voltage regulator. Further, AVS module 112A includes power-on reset module 232. Thus, when voltage summing circuit 224 is disabled, VDD passed through resistor 240, is provided as control feedback to the voltage regulator 101. However, when voltage summing circuit 224 is enabled, the contribution of VDD through closed-loop resistor 240 is generally negligible respective of the output of voltage summing circuit 224.

In operation of an embodiment, during startup, for example, a power-on reset controller 236 within power-on reset module 232 begins to monitor supply voltage, VDD gated by analog supply voltage, AVDD. In one embodiment, power-on reset controller 236 initiates a HIGH voltage on lead 237 upon detecting that both source voltages, AVDD & VDD, have achieved a minimum level and upon detecting that a predetermined number of clock cycles have been received. When the voltage on lead 237 and the voltage to an enable pin 239 are both HIGH, thereby indicating that the operational circuit module 102 is no longer instable, enable logic 238 provides a HIGH output voltage to operational amplifier 226 which activates voltage summing circuit 224. Once the operational amplifier 226 is enabled, offset current and VDD are combined, in accordance with an embodiment, to generate the circuit performance related voltage feedback signal VDDFB that is provided to the external voltage regulator 101.

In an embodiment, the power-on reset controller 236 includes a power-on detector that receives an input electrical signal and outputs a digital signal that has predetermined value when the voltage of the input electrical signal exceeds a threshold voltage. The power-on detector includes multiple voltage-shaping elements arranged in series. Each voltage-shaping element has a P-channel transistor and an N-channel transistor that differs in strength with respect to the P-channel transistor. The power-on detector also includes a switch that locks the digital signal at the predetermined value when the voltage of the input electrical signal exceeds the voltage threshold. In addition to the power-on detector, the power-on reset controller 236 includes a digital delay that receives both the digital signal and a clock signal. The power-on reset controller 236 waits a predetermined time delay after the digital signal reaches the predetermined value then de-assert the reset signal. Additional description of exemplary embodiments of power-on reset controller 236 can be found in U.S. Non-Provisional patent application Ser. No. 12/206,485, entitled, "POWER-ON-RESET GENERATOR USING A VOLTAGE-SHAPING INVERTER CHAIN," filed on Sep. 8, 2008, and assigned to Marvell Israel (MISL) Ltd.

Figure 2B:
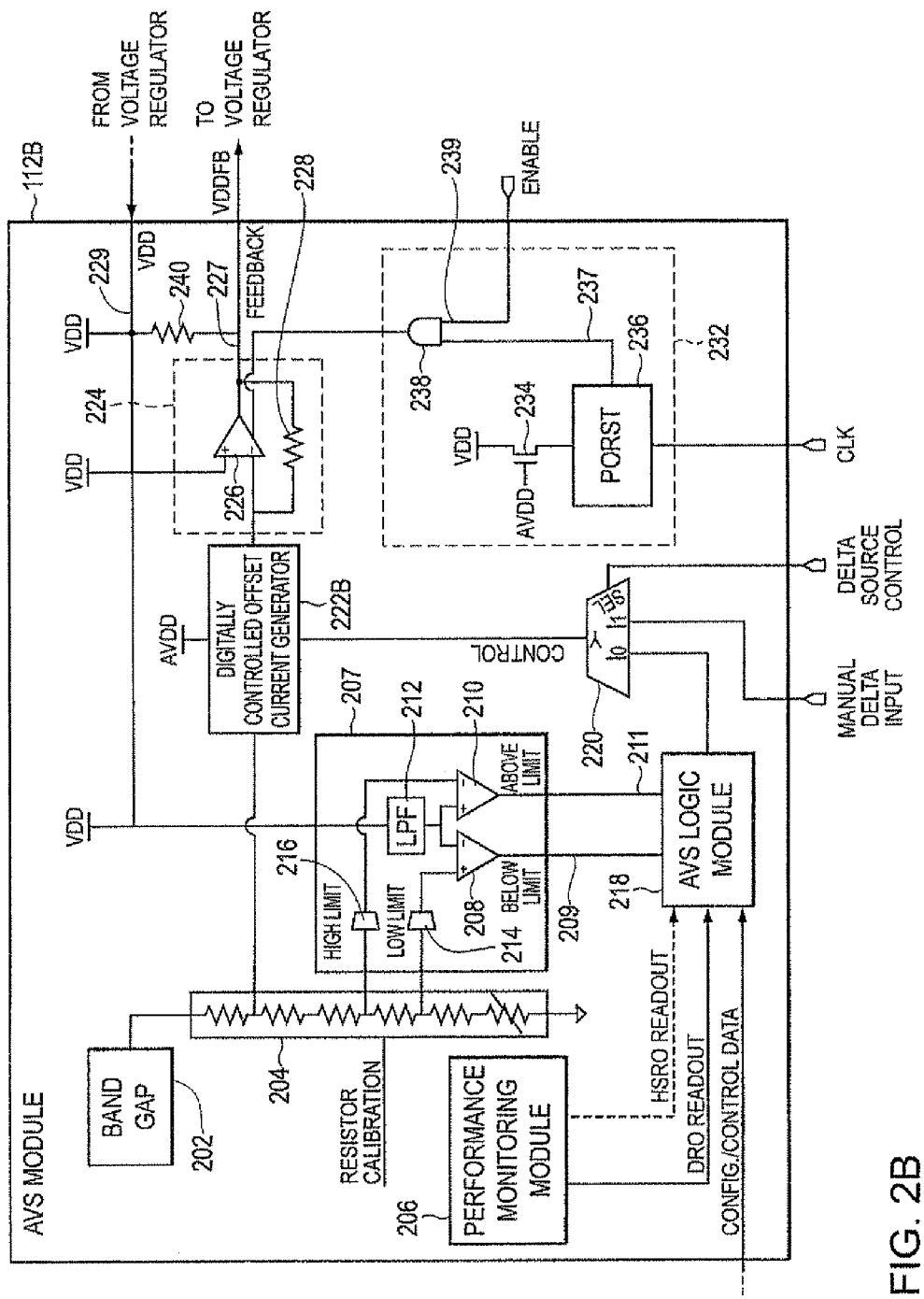
FIG. 2B shows a schematic diagram of an adaptive voltage scaling module example in accordance with an embodiment of the disclosure.

FIG. 2B shows a schematic diagram of an adaptive voltage scaling module 112B according to an embodiment of the disclosure. Similar to the AVS module 112A in FIG. 2A, AVS module 112B includes a performance monitoring module 206, AVS logic module 218, a voltage summing circuit 224, a power-on reset module 232 and closed-loop resistor 240. These elements can be similarly configured as corresponding elements in FIG. 2A, and can operate similarly as the corresponding elements in FIG. 2A.

Additionally, as seen in FIG. 2B, AVS module 112B includes a band gap voltage generator 202, a calibrated resistor stack 204, an out-of-band detector 207, multiplexer 220, and digitally controlled offset current generator 222B. Out-of-band detector 207 can include a below limit comparator 208, a high limit comparator 210, a low-pass filter 212, a lower limit voltage selector 214 and an upper limit voltage selector 216. In an example, the control signal provided by AVS logic module 218 is a digital control signal. The AVS module 112E includes a digitally controlled offset current generator 222B that is digitally controlled by the digital control signal.

In operation, for example, AVS logic module 218 receives a digital readout value from a digital ring oscillator (DRO) monitoring device 108 and, optionally, a digital readout value from a high sensitivity ring oscillator (HSRO) 110 of a performance monitoring module 106. AVS logic module 218 compares the received digital readout value(s) to corresponding performance threshold values to generate a difference value. Next, AVS logic module 218 determines a delta value, such as digital offset, based on the generated difference, as described below. The delta value is passed via multiplexer 220 to the digitally controlled offset current generator 222B, where the delta value is converted to an analog voltage, such as an analog offset, that is added by voltage summing circuit 224 to produce a feedback signal, such as VDD feedback signal VDDFB. The external voltage regulator which will either increase the generated VDD source voltage, decrease the generated VDD source voltage, or allow the generated VDD source voltage to remain the same, based on the magnitude of the feedback signal received.

Out-of-band detector 207 provides AVS logic module 218 with logic values indicating whether the source voltage, VDD, received from the voltage regulator is above a high threshold value, or below a low threshold value. For example, out-of-band detector 207 receives source voltage, VDD, and passes the signal through low-pass filter 212 to remove any extraneous noise signal. Next, below limit comparator 208, e.g., an operational amplifier configured as a comparator, compares the received source voltage, VDD, to a predetermined low threshold voltage received from lower limit voltage selector 214. If the received source voltage, VDD, is lower than the predetermined low threshold voltage, a HIGH logic value is provided to AVS logic module 218 via lead 209; otherwise, a LOW logic value is provided to AVS logic module 218 via lead 209. Further, high limit comparator 210, e.g., an operational amplifier configured as a comparator, compares the received filtered source voltage, VDD, to a predetermined high threshold voltage received from upper limit voltage selector 216. If the received source voltage, VDD, is above than the predetermined upper threshold voltage, a HIGH logic value is provided to AVS logic module 218 via lead 211; otherwise, a LOW logic value is provided to AVS logic module 218 via lead 211.

The predetermined upper threshold voltage used by out-of-band detector 207, as described above, is generated by upper limit voltage selector 216, which can be implemented using a selectable multiplexer. For example, band gap voltage source 202 may maintain a highly stable predetermined voltage level that is applied across calibrated resistor stack 204. Multiple taps (not shown in FIG. 2B) from different locations along the length of calibrated resistor stack 204 may be fed to upper limit voltage selector 216, each tap supplying upper limit voltage selector 216 with a selectable high level voltage within a range of low level voltages. In one example embodiment, upper limit voltage selector 216 is configured to pass one of the received high voltage levels to high limit comparator 210 for use as the predetermined high threshold voltage.

Similarly, the predetermined low threshold voltage used by out-of-band detector 207, as described above, is generated by lower limit voltage selector 214, which can be implemented using a selectable multiplexer.

In one embodiment, the selectable voltage levels supplied to lower limit voltage selector 214 and to upper limit voltage selector 216 are determined by the number of taps extended from calibrated resistor stack 204 and the resistance between the location of each tap on calibrated resistor stack 204 and a LOW voltage source, or ground.

In one embodiment, multiplexer 220, as described above, which is used to pass a digital control signal (e.g. a delta value) generated by AVS logic module 218 to digitally controlled offset current generator 222B, is configurable. The digital delta value corresponds to a change that is required to the VDD, in other words an increase or decrease in voltage, so an operational circuit 102 will reach a performance target. Based on a control value supplied on a delta source control lead, as seen in FIG. 2B, multiplexer 220 can be configured to pass to digitally controlled offset current generator 222B either the delta value generated by AVS logic module 218, or a delta value supplied via a manual delta input source. Such a manual delta input source can be a register that stores a predetermined delta value. Another such manual delta input source can be a user interface that is used to test the response of the integrated circuit to a manually inserted delta value.

Figure 3:
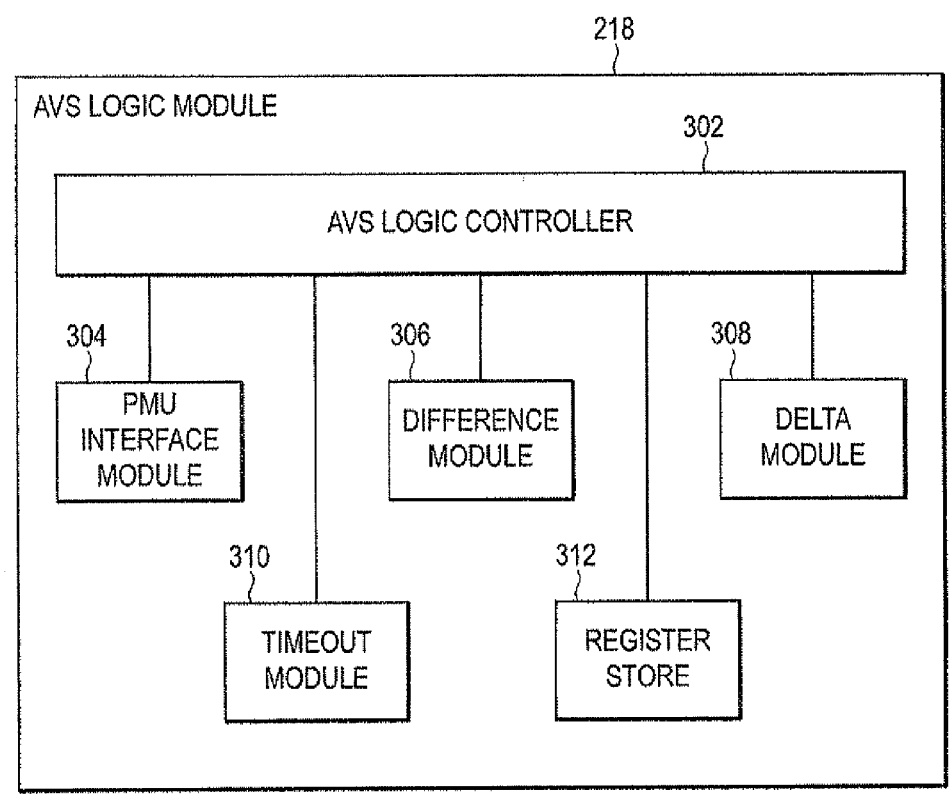
FIG. 3 shows a block diagram of a logic module in an adaptive voltage scaling module example in accordance with an embodiment of the disclosure.

FIG. 3 is a block diagram of an embodiment of AVS logic module 218, described above with respect to FIG. 2A and FIG. 2B. As seen in FIG. 3, an embodiment of AVS logic module 218 includes an AVS logic controller 302, a performance monitoring unit (PMU) interface module 304, a difference module 306, a delta module 308, a timeout module 310, and a register store 312. The modules described below with respect to FIG. 3, perform logic operations and process digital data to implement the operations performed by AVS logic module 218. It is noted that the modules described below with respect to FIG. 3 can be combined and/or distributed in any manner, and can be implemented in any combination of hardware and/or software.

In accordance with an embodiment, AVS logic controller 302, maintains a set of static and/or dynamically updated control parameters that are used to invoke the other modules included in AVS logic module 218 to perform process flows as described below with respect to FIG. 5 and FIG. 6. For example, in one embodiment, AVS logic controller 302 receives and stores a set of configuration and control data from a CPU or other controller 104 located on the same integrated circuit 100 as operational circuit module 102. In another embodiment, AVS logic module 218 communicates with and receives status updates from the respective modules within AVS logic module 218 to control operation of the respective modules in support of the respective process flows described below with respect to FIG. 5 and FIG. 6.

In accordance with an embodiment, PMU interface 304 is invoked by AVS logic controller 302 to communicate with and to periodically retrieve data from the digital ring oscillator (DRO) monitoring device 108 of performance monitoring module 106 and, optionally, to periodically retrieve data from the from high sensitivity ring oscillator (HSRO) 110 of performance monitoring module 106. For example, upon the expiration of a predetermined delay period, PMU interface 304 may send an enable signal to the DRO, and optionally to the HSRO, that instructs the DRO, and optionally the HSRO, to monitor IC performance characteristics, e.g., for a monitoring period of a predetermined number of system clock cycles. At the end of the predetermined monitoring period, PMU interface 304 can instruct the DRO, and optionally the HSRO, to return a performance value, for example a digital value, or digital readout value, that reflects one or more monitored IC performance characteristics.

In accordance with an embodiment, difference module 306 is invoked by AVS logic controller 302 to generate a difference between the performance value obtained from either a DRO or an HSRO of monitoring unit 106, and a predetermined target performance. For example, in one embodiment the predetermined target values are received from a CPU or other controller unit 104 located on the same integrated circuit 100 as operational circuit module 102 and are stored in a register maintained by AVS logic module 218. The generated difference can also be stored in a register maintained by AVS logic module 218 and processed, for example, as described below.

In accordance with an embodiment, delta module 308 is invoked by AVS logic controller 302 to determine a digital delta value corresponding to a required change in voltage to the present supply voltage based on an assessment of the difference values generated by difference module 306 and upper/lower limit threshold data, as described in greater detail with respect to FIG. 4, below. The generated delta value is provided as a logic control signal to the offset current generator 222A and is then converted to a corresponding analog voltage by the offset current generator 222A. In an embodiment the control signal is a digital control signal and the current generator is digitally controlled, although this need not be the case and various combinations of digital and/or analog control may be employed. The generated offset current is converted to a voltage and is combined with the received source voltage, VDD, to produce the feedback signal, as described above with respect to FIG. 2A and FIG. 2B.

In accordance with an embodiment, timeout module 310 can be invoked by any module within AVS logic module 218 to set a timer for an identified event. For example, PMU interface 304 can invoke timeout module 310 to set a process monitoring delay timer upon the expiration of which PMU interface 304 sends an enable signal to the DRO monitoring device 108, and the optional HSRO monitoring device 110, of performance monitoring module 106, as described above. Further, after sending such enable signals, PMU interface 304 can invoke timeout module 310, again to set a timer upon the expiration of which PMU interface 304 instruct the DRO 108, and optionally the HSRO 110, to return a digital value, or digital readout value, that reflect one or more monitored IC performance characteristics, as described above.

In accordance with an embodiment, register store 312 is a collection of physical memory registers that are used by AVS logic module 218 to store received configuration and control parameters, as well as to store temporary values, such as DRO/HSRO readout values, generated difference values, generated Delta values, etc., generated during executed process flows, such as the process flows described below with respect to FIG. 5 and FIG. 6. In one embodiment, the registers within register store 312 are read/write accessible to all modules within AVS logic module 218. In other embodiments, write access to some of the registers in register store 312 can be restricted.

Figure 4:
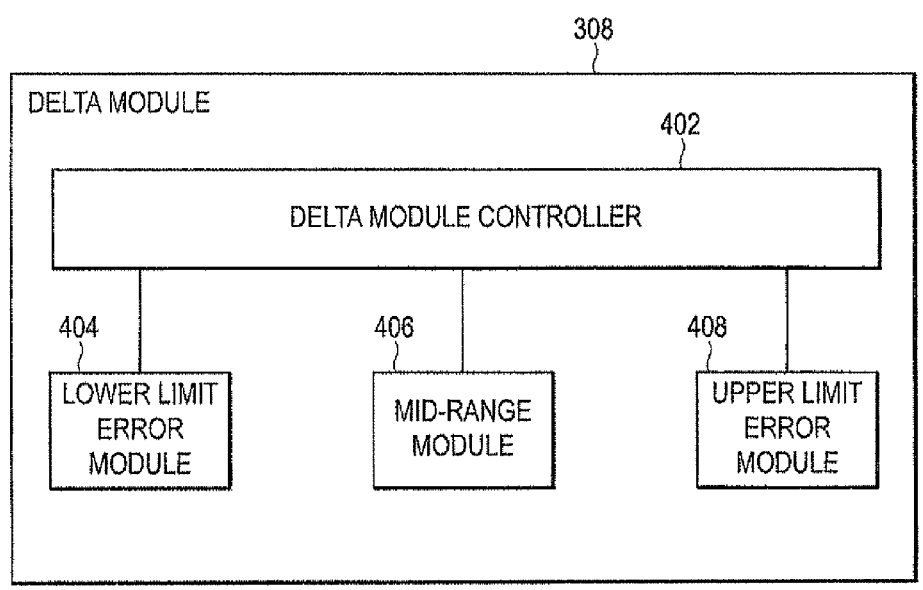
FIG. 4 shows a block diagram of a delta module example in accordance with an embodiment of the disclosure.

FIG. 4 is a block diagram of and embodiment of delta module 308 described above with respect to FIG. 3. As seen in FIG. 4, an embodiment of delta module 308 includes a delta module controller 402, a lower limit error module 404, a mid-range module 406, and an upper limit error module 408. In an embodiment, lower limit is provided by signal 209, which upper limit is provided by signal 211 (FIG. 2A and FIG. 2B). The modules described below with respect to FIG. 4, assist with the generation of delta values and/or error signals as described below with respect to FIG. 5 and FIG. 6. It is noted that the modules described below with respect to FIG. 4 can be combined and/or distributed in any manner, and can be implemented in any combination of hardware and/or software.

In accordance with an embodiment, delta module controller 402, maintains a set of static and/or dynamically updated control parameters that are used to invoke the other modules included in delta module 308 to perform actions in process flows described below with respect to FIG. 5 and FIG. 6. For example, in one embodiment, delta module controller 402 receives and stores a set of configuration and control data from AVS logic controller 302.

In accordance with an embodiment, lower limit error module 404 is invoked to generate an error signal when the AVS module determines that the received source voltage, VDD, delivered to the IC powered device is below a required minimum voltage, yet the DRO/HSRO readout values indicate that the monitored performance characteristic(s) of the IC powered device exceed a predetermined threshold. Such an error may be generated and transmitted to a CPU or other controller unit 104 located on the same integrated circuit 100 as the IC powered device to indicate that the powered device exceeds a power consumption level specified in a specification requirement for the IC device.

In accordance with an embodiment, mid-range module 406 is invoked to generate a delta value when the AVS module determines that the received source voltage, VDD, delivered to the IC powered device is between the specified minimum voltage and the specified maximum value. As described above, the delta value is determined based on whether the DRO/HSRO readout values indicate that the monitored performance characteristic(s) is above, or below, a predetermined target value. In one embodiment, the magnitude of the delta value is selected to move the source voltage, VDD, at a rate of approximately 1.5 mv/20 µs. In other embodiments, the magnitude of the selected delta can be based on the magnitude of the difference between the DRO/HSRO readout values and the corresponding target values, so long as a maximum delta value is not exceeded.

In accordance with an embodiment, upper limit error module 408 is invoked to generate an error signal when the AVS module determines that the received source voltage, VDD, delivered to the IC powered device is above a required maximum voltage, yet the DRO/HSRO readout values indicate that the monitored performance characteristic(s) of the IC powered device fall below a predetermined threshold. Such an error may be generated and transmitted to a CPU or other controller unit 104 located on the same integrated circuit 100 as the IC powered device to indicate that the powered device fails to meet a speed or other minimum performance level specified in a specification requirement for the IC device.

Figure 5:
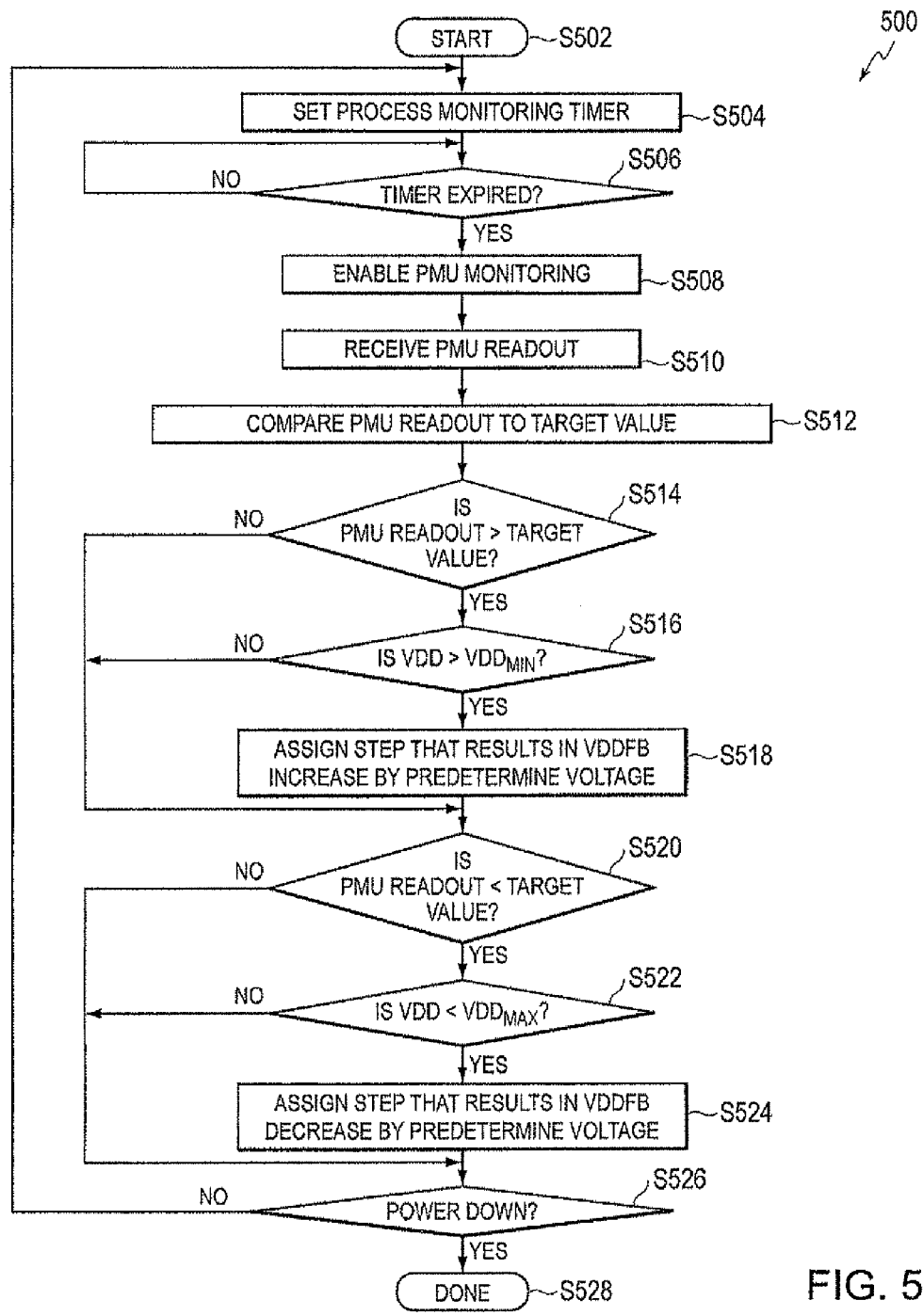
FIG. 5 shows a flow-chart of a process flow example that is performed by an adaptive voltage scaling module in accordance with an embodiment of the disclosure.

FIG. 5 is a flow-chart of a process flow that is performed by the AVS module 112 of FIG. 1A to control the generation of digital delta values, the use of which is described above. As seen in FIG. 5, operation of process 500 begins at S502 and proceeds to S504.

At S504, PMU interface module 304 invokes timeout module 310 to set a monitoring delay timer, and operation of the process continues at S506.

At S506, if PMU interface module 304 determines that the monitoring delay timer has expired, operation of the process continues at S508; otherwise, operation of the process returns to S506, waits and checks the monitoring delay timer.

At S508, PMU interface module 304 initiates PMU monitoring by sending an enable signal to performance monitoring unit 106 to initiate a monitoring period by the DRO 108, and optionally, additional monitoring by the HSRO 110, and operation of the process continues at S510.

At S510, PMU interface module 304 receives a digital readout value from the DRO 108 of performance monitoring unit 106, and optionally, a digital readout value from the HSRO 110 of performance monitoring unit 106, and operation of the process continues at S512.

At S512, AVS logic controller 302 compares the readout value(s) received by PMU interface module 304 to corresponding target values, and operation of the process continues at S514.

At S514, if AVS logic controller 302 determines that the readout values exceed one or more predetermined target values, the operation of the process continues at S516; otherwise, operation of the process continues at S520.

At S516, if AVS logic controller 302 determines that the source voltage, VDD, is larger than a predetermined allowed minimum value, operation of the process continues at 5518; otherwise, operation of the process continues at S520.

At S518, the AVS logic controller 302 assigns a predetermined value to the delta value that has been predetermined to result in a predetermined increase in the generated feedback signal VDDFB, and operation of the process concludes at S520.

At S520, if AVS logic controller 302 determines that the readout values are below one or more predetermined target values, operation of the process continues at S522; otherwise, operation of the process continues at S526.

At S522, if AVS logic controller 302 determines, e.g., based on the threshold logic values received from out-of-band detector 207, that the source voltage, VDD, is below a predetermined allowed maximum value, operation of the process continues at S524; otherwise, operation of the process continues at S526.

At S524, the AVS logic controller 302 assigns a predetermined value to the delta value that has been predetermined to result in a predetermined decrease in the generated feedback signal VDDFB, and operation of the process continues at S526.

At S526, if AVS logic controller 302 determines that a power down request has been received, operation of the process concludes at step S528; otherwise, operation of the process continues at S504.

Figure 6:
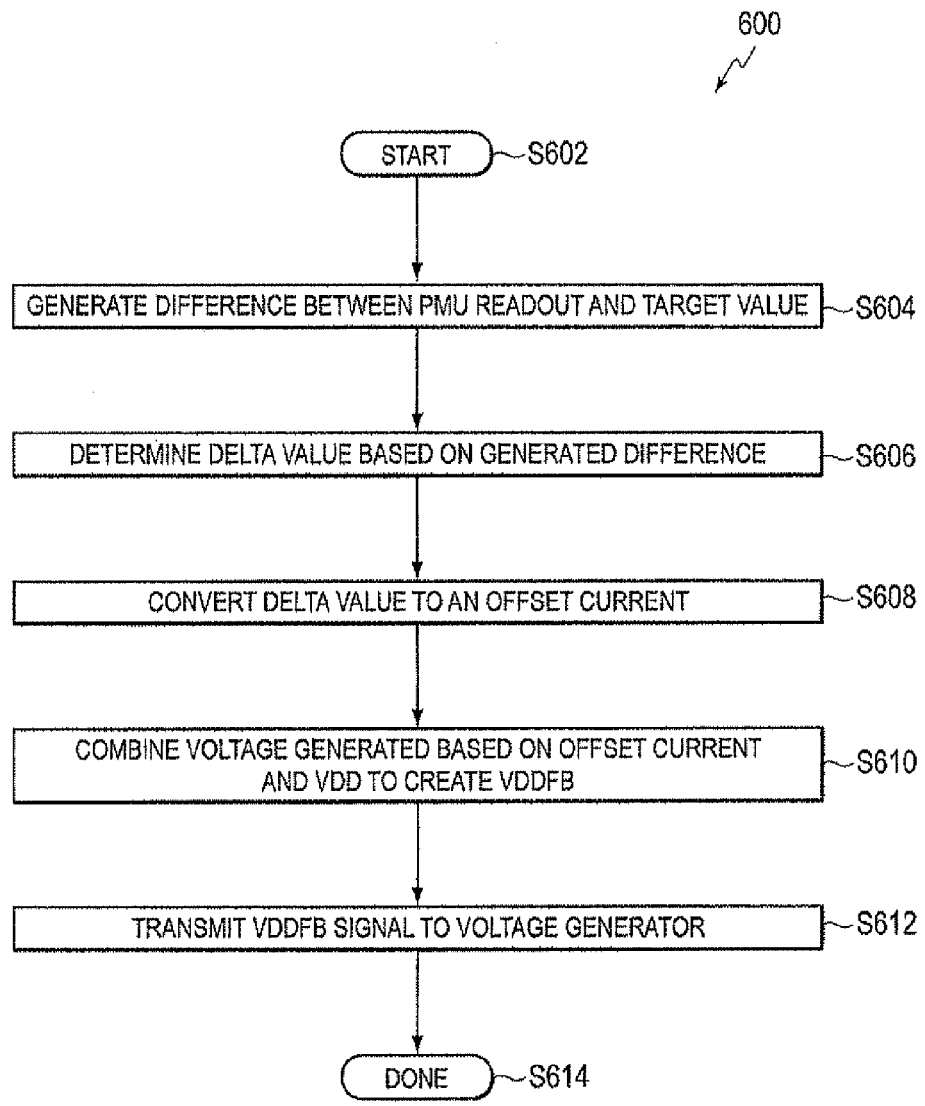
FIG. 6 shows a flow-chart of a process flow example performed by an adaptive voltage scaling module in accordance with an embodiment of the disclosure.

FIG. 6 is a flow-chart of a process flow performed by AVS module 112 in accordance with an embodiment of the disclosure. As seen in FIG. 6, operation of process 600 begins at S602 and proceeds to S604.

At S604, AVS logic controller 302 invokes difference module 306 to generate a difference between the received DRO, and optionally an HSRO, readout value received from performance monitoring module 106 and predetermined corresponding target values, and operation of the process continues at S606.

At S606, AVS logic controller 302 invokes mid-range module 406 to generate a control logic delta value, such as a digital feedback corresponding to a voltage offset, based on the determined difference, and operation of the process continues at S608.

At S608, the generated control logic delta value is passed, e.g., via multiplexer 220, to offset current generator 222, which generates an offset current. In accordance with an embodiment, the control logic delta value is a digital value that is converted to an analog current offset, and operation of the process continues at S610.

At S610, the generated analog current is added, as a voltage, to the source voltage, VDD, to produce voltage feedback signal, and operation of the process continues at 5612.

At S612, the generated voltage feedback signal, which in an embodiment is an analog signal that is transmitted via a single pin connector to the external voltage regulator to control the magnitude of the source voltage, VDD, provided by the external voltage regulator to the powered IC device 102, and operation of the process concludes at S614.

Figure 7:
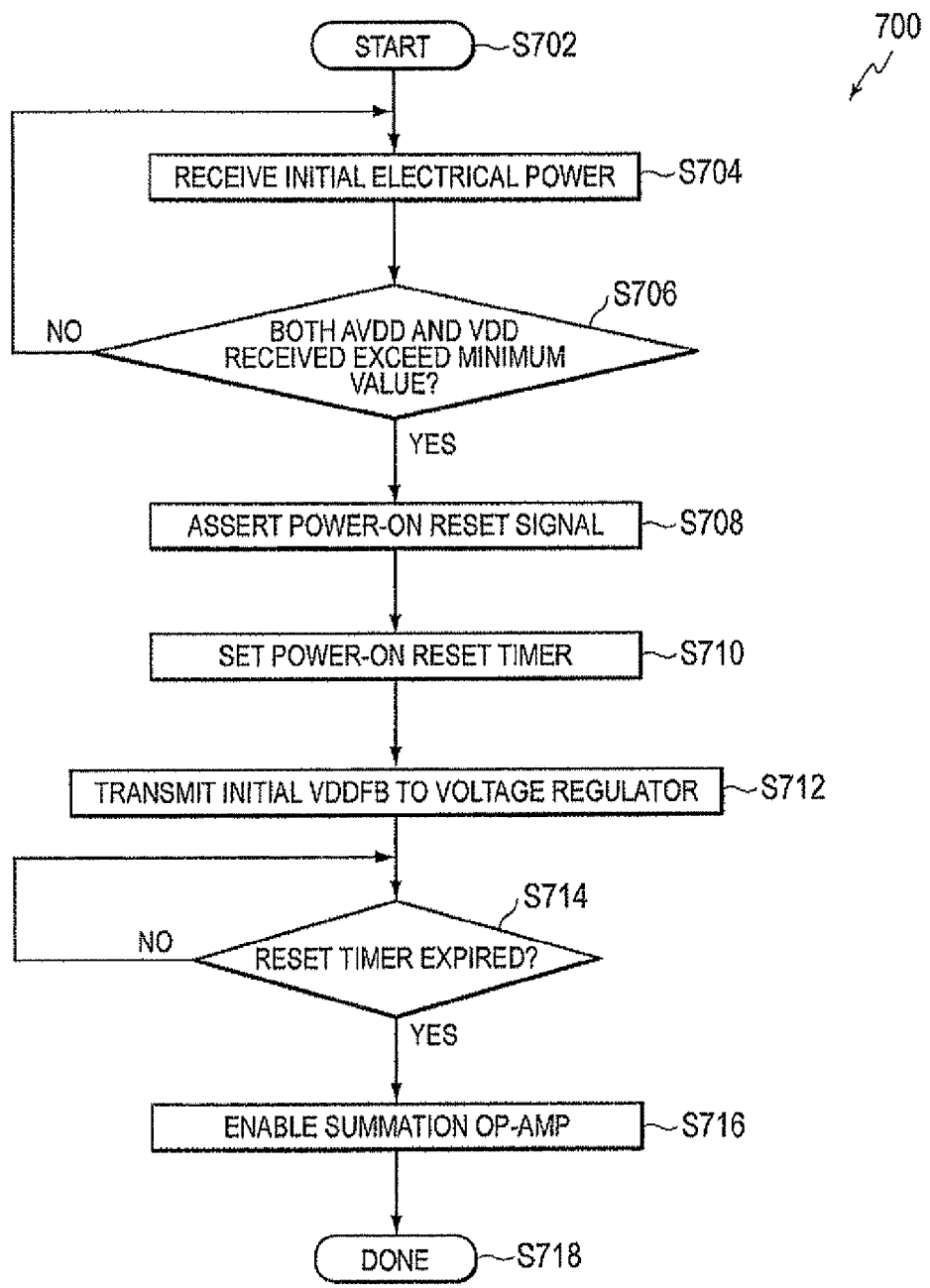
FIG. 7 shows a flow-chart of a process flow performed by a power-on reset module in accordance with an embodiment of the disclosure.

FIG. 7 is a flow-chart of a process flow performed by power-on reset module 232, described above with respect to FIG. 2A and FIG. 2B, to generate a power-on reset enable signal that ensures that the voltage summing circuit 224 is inactive during startup of an operational circuit module 102, as described with reference to FIG. 2A and FIG. 2B, and subsequently activates voltage summing circuit 224 once operation of the operational circuit module 102 has stabilized. As seen in FIG. 7, operation of process 700 begins at S702 and proceeds to S704.

At S704, switch 234 receives an initial voltage level on the VDD lead connected to the source of switch 234, and receives another voltage, such as an initial voltage level for analog circuits, on the AVDD lead connected to the gate of switch 234, and operation of the process continues at S706.

At S706, when both received AVDD and VDD voltages exceed corresponding minimum values, operation of the process continues at S708; otherwise, operation of the process continues at S704.

At S708, power-on reset module 232 asserts a HIGH power-on-reset enable signal, and operation of the process continues at S710.

At S710, power-on reset module 232 sets a reset duration timer with a duration that has been predetermined to provide sufficient time for IC operational circuit module 102 and the external voltage regulator to achieve a stable startup state, and operation of the process continues at S712.

At S712, an initial feedback voltage is provided to the external voltage regulator. In an embodiment, when the IC operational circuit module 102 is in a start-up mode, the voltage summing circuit 224 is disabled before the reset duration timer is expired. The operational circuit module 102 includes an initial feedback voltage generation module to supply the initial feedback voltage to the external voltage regulator. In an example, the initial feedback voltage generation module is implemented as a closed-loop resistor 240 as shown in FIG. 2A and FIG. 2B. Operation of the process continues at S714.

At S714, if power-on reset module 232 determines that the previously set reset duration timer has expired, operation of the process continues at S716; otherwise, operation of the process continues at S714.

At S716, the power-on reset module 232 provides a signal to enable the operational amplifier 226. In an embodiment, the power-on reset module 232 provides a HIGH output voltage to the enable logic 238. The enable logic 238 provides a HIGH output voltage to operational amplifier 226, which activates voltage summing circuit 224 to produce the feedback voltage signal VDDFB based on at least one performance characteristic of the operational circuit module 102, and operation of the process continues at S718.

It is noted that in the description above, in an embodiment analog voltage source, AVDD, is a voltage source received from an external power supply that is separate from the voltage regulator controlled by the feedback signal. In one embodiment, the analog voltage source, AVDD, is held at a voltage level greater than the maximum voltage allowed for source voltage, VDD, and, therefore analog voltage source, AVDD, is always greater than source voltage, VDD.

For purposes of explanation in the above description, numerous specific details are set forth in order to provide a thorough understanding of the described adaptive voltage scaling module and adaptive voltage scaling approach that are compatible with voltage regulators controlled by an analog feedback signal. It is noted, however, that the described embodiments may be practiced without these specific details. In other instances, various structures and devices are omitted from the figures, or are depicted in simplified block diagram form, in order to avoid obscuring the teaching features of the described embodiments.

While the adaptive voltage scaling module and adaptive voltage scaling approach that are compatible with voltage regulators controlled by an analog feedback signal have been described in conjunction with the specific embodiments thereof, it is evident that many alternatives, modifications, and variations will be apparent to those skilled in the art. Accordingly, the described embodiments, as set forth herein, are intended to be illustrative, not limiting. There are changes that may be made without departing from the spirit and scope of the invention.

What is claimed is:

1. An integrated circuit, comprising:
one or more voltage supply pins configured to receive a supply voltage from a voltage regulator;
an analog sense pin coupled to a voltage feedback pin of the voltage regulator, the voltage feedback pin being separated from the one or more voltage supply pins, the analog sense pin configured to output a sense voltage to the voltage feedback pin of the voltage regulator; and
a controller configured to drive the analog sense pin to output the sense voltage, which is higher than a target voltage of the voltage regulator for decreasing the supply voltage of the voltage regulator, based on a timing performance characteristic of the integrated circuit, a voltage level of the sense voltage being set to cause the voltage regulator to increase voltage supplied to the integrated circuit when a speed of the integrated circuit fails to meet a timing performance requirement.

2. The integrated circuit of claim 1, wherein the voltage regulator is governed by the sense voltage and a reference voltage.

3. The integrated circuit of claim 1, further comprising:
a voltage level adjustor coupled with the controller to drive the analog sense pin.

4. The integrated circuit of claim 1, wherein no current flows on the coupling that provides the sense voltage.

5. The integrated circuit of claim 1, wherein the voltage regulator has a target voltage that is set based on one of power, performance, and minimum voltage of the integrated circuit.

6. A method for controlling a supply voltage, comprising:
receiving, by one or more voltage supply pins, a supply voltage from a voltage regulator;
outputting a sense voltage to a voltage feedback pin of the voltage regulator by an analog sense pin coupled to the voltage feedback pin of the voltage regulator and separated from the one or more voltage supply pins; and
driving, by a controller, the analog sense pin to output the sense voltage, which is higher than a target voltage of the voltage regulator for decreasing the supply voltage of the voltage regulator, based on a timing performance characteristic of the integrated circuit, a voltage level of the sense voltage being set to cause the voltage regulator to increase voltage supplied to an integrated circuit when a speed of the integrated circuit fails to meet a timing performance requirement.

7. The method of claim 6, wherein the voltage regulator is governed by the sense voltage and a reference voltage.

8. The method of claim 6, wherein the analog sense pin is driven by the controller coupled with a voltage level adjustor.

9. The method of claim 6, wherein no current flows on the coupling that provides the sense voltage.

10. The method of claim 6, further comprising:
setting a target voltage of the voltage regulator based on one of power, performance, and minimum voltage of the integrated circuit.

11. An integrated circuit, comprising:
a pin on a device of the integrated circuit, the pin configured to drive a feedback voltage to a voltage regulator that is configured to supply voltage to the device via a supply pin separated from the pin; and
a pair of voltage supplies configured to supply analog voltages to an adaptive voltage scaling circuit coupled with a digital ring oscillator (DRO) indicating a timing performance of the device, the adaptive voltage scaling circuit including an offset generator configured to receive an output signal from the DRO and the supply voltage.

12. The integrated circuit of claim 11, wherein a level of the feedback voltage is driven based on the timing performance and a level of the supply voltage.

13. The integrated circuit of claim 11, wherein the adaptive voltage scaling circuit includes an adder configured to sum the supply voltage and an output signal from the offset generator for generating the feedback voltage.

14. A method for controlling a supply voltage to a device, comprising:
driving a feedback voltage to a voltage regulator that is configured to supply voltage to the device of an integrated circuit via a supply pin by a dedicated pin that is separated from the supply pin:
supplying a pair of analog voltages to an adaptive voltage scaling circuit coupled with a digital ring oscillator (DRO) indicating a timing performance of the device; and
receiving an output signal from the DRO and the supply voltage by an offset generator included in the adaptive voltage scaling circuit.

15. The method of claim 14, further comprising:
driving the feedback voltage based the timing performance and a level of the supply voltage.

16. The method of claim 14, further comprising:
summing the supply voltage and an output signal from the offset generator by an adder for generating the feedback voltage.

\* \* \* \* \*